(12) United States Patent
Iisaka

(10) Patent No.: US 9,262,975 B2
(45) Date of Patent: Feb. 16, 2016

(54) DISPLAY DEVICE, DISPLAY METHOD, AND PROJECTION TYPE DISPLAY DEVICE

(71) Applicant: SEIKO EPSON CORPORATION, Tokyo (JP)

(72) Inventor: Hidehito Iisaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/472,118

(22) Filed: Aug. 28, 2014

(65) Prior Publication Data

US 2014/0368560 A1    Dec. 18, 2014

Related U.S. Application Data

(63) Continuation of application No. 12/721,107, filed on Mar. 10, 2010, now abandoned, which is a continuation of application No. 11/056,246, filed on Feb. 14, 2005, now abandoned.

(30) Foreign Application Priority Data

Feb. 18, 2004   (JP) .................................. 2004-41308

(51) Int. Cl.
*G09G 3/36* (2006.01)
*G09G 3/34* (2006.01)
*H04N 9/31* (2006.01)
*G09G 3/00* (2006.01)

(52) U.S. Cl.
CPC .............. *G09G 3/3607* (2013.01); *G09G 3/001* (2013.01); *G09G 3/3426* (2013.01); *G09G 3/3611* (2013.01); *H04N 9/3114* (2013.01); *H04N 9/3155* (2013.01); *G09G 2310/0235* (2013.01); *G09G 2320/0646* (2013.01); *G09G 2360/12* (2013.01); *G09G 2360/144* (2013.01); *G09G 2360/16* (2013.01)

(58) Field of Classification Search
CPC ... G09G 3/3607; G09G 3/001; G09G 3/3426; G09G 3/3611; H04N 9/3114; H04N 9/3155
USPC ...................... 352/41, 57; 348/333.1, 333.01, 348/739–786; 345/207, 697, 9, 84–88
See application file for complete search history.

(56) References Cited

U.S. PATENT DOCUMENTS 6,005,722 A    12/1999  Butterworth et al.
6,215,547 B1   4/2001   Ramanujan et al.
6,490,095 B2   12/2002  Okuyama et al.

(Continued)

FOREIGN PATENT DOCUMENTS

JP    2002-229531   8/2002
JP    2002-251175   9/2002

(Continued)

*Primary Examiner* — Christopher E Leiby
(74) *Attorney, Agent, or Firm* — Oliff PLC

(57) ABSTRACT

Aspects of the invention can provide a display device, a display method, and a projection type display device that allow a characteristic of a display image such as brightness to be continuously changed. The display device can include a light source capable of emitting a plurality of different color lights and a white light, and an optical modulation device for modulating light corresponding to the lights emitted from the light source. The ratio of the period of emitting the white light relative to the total of the periods of emitting the lights from the light source can be variable.

11 Claims, 12 Drawing Sheets

(56) References Cited

U.S. PATENT DOCUMENTS

| | | |
|---|---|---|
| 6,911,963 B2 | 6/2005 | Baba et al. |
| 6,961,038 B2 | 11/2005 | Yoshinaga et al. |
| 6,972,777 B2 | 12/2005 | Shigeta |
| 7,050,120 B2 | 5/2006 | Allen et al. |
| 7,106,276 B2 | 9/2006 | Akiyama |
| 2002/0063670 A1 | 5/2002 | Yoshinaga et al. |
| 2002/0109821 A1 | 8/2002 | Huibers et al. |
| 2002/0196220 A1 | 12/2002 | Sato et al. |
| 2003/0214725 A1 | 11/2003 | Akiyama |
| 2004/0207652 A1 | 10/2004 | Ratti et al. |
| 2005/0237288 A1 | 10/2005 | Yoshinaga et al. |
| 2006/0203132 A1 | 9/2006 | De Vaan et al. |

FOREIGN PATENT DOCUMENTS

| | | |
|---|---|---|
| JP | 2003-241165 | 8/2003 |
| JP | 2003-295156 | 10/2003 |
| JP | 2004-004626 | 1/2004 |
| JP | 2005-043854 | 2/2005 |

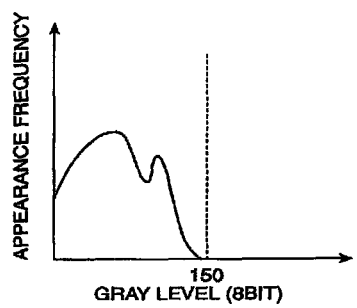
FIG. 5
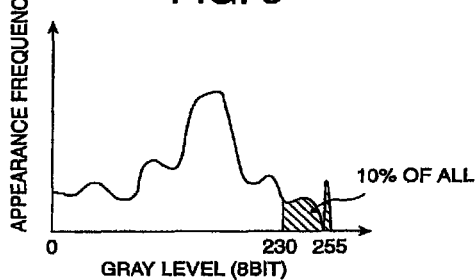
FIG. 6
| $A_{11}$ | $A_{12}$ | $A_{13}$ | ... | ... | $A_{1n}$ |
|---|---|---|---|---|---|
| $A_{21}$ | ... | ... | | | |
| $A_{31}$ | ... | ... | | | |
| ⋮ | ... | ... | | | |
| ⋮ | ... | ... | | | |
| $A_{m1}$ | ... | ... | | | $A_{mn}$ |
FIG. 7

DISPLAY DEVICE, DISPLAY METHOD, AND PROJECTION TYPE DISPLAY DEVICE

This is a Continuation of application Ser. No. 12/721,107 filed Mar. 10, 2010 which is a Continuation Application of application Ser. No. 11/056,246 filed Feb. 14, 2005, which claims the benefit of JP Application No. 2004-041308 filed Feb. 18, 2004. The disclosure of the prior applications are hereby incorporated by reference herein in their entirety.

BACKGROUND

Aspects of the invention relate to a display device, a display method, and a projection type display device.

As information equipment has made remarkable developments, there has been an increasing demand for high resolution, less power consuming, and thin image display devices, and search and development are underway to provide such devices. Among all, a liquid crystal display device can electrically control the orientation of liquid crystal molecules and change the optical characteristics, and is expected to be a display device to satisfy the above demand. A projection type liquid crystal display device (liquid crystal projector) that expands and projects a display image emitted from an optical system using a liquid crystal valve on a screen with a projection lens is as an example of a related art liquid crystal display device.

The projection type liquid crystal display devices are divided into so-called three-plate type devices and single plate type devices. In the three-plate type device, light from the light source is for example separated into three R (red), G (green), and B (blue) color lights, and three liquid crystal light valves corresponding to these color lights are used to carry out optical modulation. The single-plate type device carries out optical modulation to the color lights using one liquid crystal light valve. The single plate type display device that uses only one liquid crystal light valve has a simple optical system accordingly, and therefore can be compact.

When color display is carried out using a white light source in the single-plate, projection type display device, there are two kinds of such display. One is a space divisional type display in which a liquid crystal light valve including a color filter is used and three dots for R, G, and B form one pixel. The other is a time divisional type display in which a white light is temporally separated into R, G, and B color lights using a color wheel or the like, and time divisional driving (color sequential display) is carried out using the liquid crystal light valve.

Techniques of irradiating R, G, and B color lights to a light valve using a light source (such as a light emitting diode (LED)) that emits these color lights instead of a white light source and a color filter have been disclosed. However, the quantity of light emitted from the LED is less than that of a light source, such as a lamp, and the displayed image could be dark. An image displayed by the color sequential display described above can be even darker, and techniques of brightening displayed images have been developed. See, for example, Japanese Patent Laid-Open No. 2002-251175.

In the disclosure of Japanese Patent Laid-Open No. 2002-251175, when an image is brightened based on the display content in a display device that carries out color sequential display, the color components of color lights R (red), G (green), and B (blue) are changed to C (cyan), Y (yellow), and M (magenta).

By the method disclosed by Japanese Patent Laid-Open No. 2002-251175, when the color components are changed (for example from (R, G, B) to (C, Y, M)), change in the brightness of the image can be disconnected. When the brightness change is disconnected in the image, the viewer may find the displayed image unnatural.

SUMMARY

An aspect of the invention provides a display device, a display method, and a projection type display device that allow a characteristic of a display image such as brightness to be continuously changed.

An exemplary display device according to the invention can include a light source capable of time-sequentially emitting a plurality of different color lights and a white light (a color light W), and an optical modulation device for modulating light corresponding to the lights emitted from the light source, and the ratio of the period of emitting the white light relative to the total of the periods of emitting the lights from the light source is variable.

More specifically, with the display device according to the invention, the ratio of the period of emitting the white light relative to the total of periods of emitting the lights from the light source can continuously be changed, so that the brightness of the display image can continuously be changed.

More specifically, the display of an image by the white light can be added to the display of images by the color lights, and the brightness of the displayed image is increased. By changing the ratio of the period of displaying the image by the white light, the ratio of the brightness increase in the displayed image can be changed. More specifically, when the ratio of the period of emitting the white light is gradually increased, the ratio of the displayed image by the white light increases, so that the image displayed is gradually brightened. Meanwhile, when the ratio of the period of emitting the white light is gradually reduced, the ratio of the display image by the white light decreases, so that the image displayed is gradually darkened.

Herein, the white light refers to light that includes at least R, G, and B wave lengths, and does not disturb the color balance of the displayed image (including the range that can be corrected by the optical modulation means) or does not let the viewer perceive color imbalance if any. More specifically, in order to achieve the above-described aspect, the ratio of periods of emitting the plurality of different color lights and the white light can preferably be adjusted to a prescribed value.

In this way, since the ratio of periods of emitting the plurality of different color lights and the white light can be adjusted to a prescribed value, the brightness of the displayed image can be adjusted to a prescribed brightness level.

More specifically, in order to achieve the above-described aspect, the ratio of the period of emitting the white light may be adjusted based on a video signal input to the display device. In this way, since the ratio of the period of emitting the white light may be adjusted based on the input video signal, the brightness can be adjusted based on the content of the displayed image. Therefore, when an image of a bright content is displayed, the brightness of the displayed image can be increased, while an image of a dark content is displayed, the brightness of the displayed image can be lowered. In other words, the image can be displayed in brightness suitable for the content of the displayed image.

More specifically, in order to achieve the above-described aspect, a detection device for detecting the ambient brightness may be provided, and the ratio of the period of emitting the white light may be adjusted based on the output of the brightness detection device. In this way, the ratio of the period of emitting the white light can be adjusted based on the ambient brightness, so that the brightness of the displayed image can be adjusted based on the ambient brightness. Therefore, when the ambient brightness increases, the brightness of the displayed image can be increased, while when the ambient brightness is lowered, the brightness of the displayed image can be lowered, so that the displayed image can easily be viewed.

More specifically, in order to achieve the above-described aspect, there can be an input portion for inputting the ratio of the period of emitting the white light, and the ratio of the period of emitting the white light may be adjusted based on a signal input to the input portion. In this way, the ratio of the period of emitting the white light may be adjusted based on the signal input to the input portion, and therefore the brightness of the displayed image can be adjusted using the input portion. Therefore, the viewer can adjust the brightness of the image through the input portion, and the brightness of the image can be adjusted to the viewer's taste.

More specifically, in order to achieve the above-described aspect, the light source preferably has light emitting portions that emit the plurality of different color lights respectively. More preferably, the light emitting portion is a solid light source. In this way, different color lights can directly be emitted from the light emitting portions in arbitrary timings. Therefore, as compared to the combination of a white light source and a color wheel, the number of elements is reduced, so that the light source can be reduced in size.

The use of the solid light source reduces heat generation, for example, as compared to a high pressure mercury lamp, and therefore the input electric power can efficiently be converted into light. Therefore, the power consumption by the light source can be reduced, so that the power consumption by the projection type display device can be reduced.

More specifically, in order to achieve the above-described aspect, during the period of emitting the white light, the white light is emitted by simultaneously emitting the different color lights from the light emitting portions that emit the different color lights. In this way, the white light is emitted by simultaneously emitting the different color lights, and therefore as compared to the case of separately providing the light emitting portion that emits the white light, the number of kinds of the light emitting portions is reduced. Therefore, when the size of the light source is equal, the number of light emitting portions that emit prescribed color lights can be increased for the number of emitting portions for the white light that are not necessary, so that the light quantity of the emitted color lights can be increased. When the number of light emitting portions that emit prescribed color lights is equal, the light source can be reduced in size by the size of the light emitting portions that emit the white light that are not necessary.

More specifically, in order to achieve the above-described aspect, the light source may include a white light emitting portion that can emit the white light, and during the period of emitting the white light, a white light may be emitted from the white light emitting portion. In this way, there is the white light emitting portion capable of emitting the white light, and the white light is emitted from the white light emitting portion. Therefore, as compared to the case of emitting the white light by simultaneously emitting different color lights, fluctuations in the power consumption can be reduced.

More specifically, as compared to the case of emitting the white light by simultaneously emitting different color lights, the number of light emitting portions that turn on can be reduced at the time of emitting the white light, and the light emitting portions substantially as many as that in the case of emitting the other color lights are turned on. Therefore, fluctuations in the power consumption can be reduced to a small level.

More specifically, in order to achieve the above aspect, in the display device in which the different color lights are sequentially emitted, the white light may be emitted in a part of the sub unit period. In this way, the white light is emitted in a part of the sub unit period for emitting a prescribed color light, and therefore, the brightness of the image to be displayed can continuously be changed simply by changing the turning on sequence of the light emitting portions without changing the duration of one unit period and a sub unit period.

For example, unlike the case of adding a sub unit period for emitting the white light, the duration of the unit period is not changed, and therefore the cycle of the images to be displayed corresponding to the color lights is not extended. Therefore, the images corresponding to the color lights hardly look disconnected, so that the picture quality of the images can be prevented from being lowered. Unlike the case of adding the sub unit period for emitting the white light and shortening the sub unit periods (by raising the driving frequency) and keeping the duration of the unit period unchanged, the driving circuit for the display device does not have to be changed because the driving frequency is not changed, and the brightness of the displayed image can continuously be changed.

The white light is emitted in a part of the sub unit period for emitting the prescribed color light, and therefore the white light is irradiated on a location where an optical modulation pattern corresponding to the prescribed color light is formed by optical modulation means. Therefore, the brightness of the displayed image can continuously be changed without forming another optical modulation pattern corresponding to the white light.

For example, unlike the case of adding a sub unit period for emitting the white light, an optical modulation pattern corresponding the white light does not have to be formed from a video signal, and therefore the brightness of the displayed image can continuously be changed without changing the driving circuit for the display device.

More specifically, in order to achieve the above-described aspect, in the display device in which the different color lights are sequentially emitted, when the white light is emitted, a sub unit period for emitting the white light may be added to one unit period. In this way, the sub unit period for emitting the white light is added to the unit period, and therefore an image corresponding to the white light can be displayed by the optical modulation means. Therefore, the brightness of the displayed image can continuously be changed based on the content of the image.

More specifically, the image corresponding to the white light can be displayed independently of the images corresponding to the other color lights, and therefore the brightness in a prescribed region of the image for example can be enhanced, in other words, the brightness can effectively be changed based on the content of the image.

More specifically, in order to achieve the above-described aspect, the duration of said unit period may be unchanged regardless of the presence/absences of an additional sub unit period for emitting the white light. In this way, the duration of the unit period is not changed, and therefore the cycle of displaying the images corresponding to prescribed color lights is not changed, so that the images corresponding to the color lights hardly look disconnected, and the picture quality of the display image can be prevented from being lowered.

More specifically, in order to achieve the above-described aspect, the duration of the sub unit period may be the same as that in the case without the additional sub unit period for emitting the white light. In this way, the duration of the sub unit period is not changed, and therefore the brightness of the displayed image can continuously be changed without changing the driving frequency for the display device.

Unlike the case of shortening the duration of the sub unit period and keeping the duration of the unit period unchanged, the driving frequency for the display device is not changed, and therefore the brightness of the displayed image can continuously be changed without changing the driving circuit for the display device.

More specifically, in order to achieve the above-described aspect, the optical modulation device is preferably a liquid crystal panel. In this way, by controlling voltage that drives the liquid crystal panel, the ratio of light transmitted through the liquid crystal panel (transmittance) or the ratio of light reflected by the panel can continuously be controlled about in the range from 0% to 100%. Therefore, the brightness of the displayed image can precisely be adjusted.

A displaying method according to the invention uses a display device that can include a light source capable of time-sequentially emitting a plurality of different color lights and a white light, and an optical modulation device for modulating light corresponding to the lights emitted from the light source. The ratio of the period of emitting the white light relative to the total of the periods of emitting the lights emitted from the light source is variable.

More specifically, by the display method according to the invention, the ratio of the period for emitting the white light relative to the total of the periods for emitting the lights from the light source is continuously changed, so that the brightness of the displayed image can continuously be changed. In other words, in addition to the display of the images by the color lights, the image by the white light can be provided, so that the brightness of the displayed image can be increased, and the ratio of the brightness increase in the displayed image can be changed by changing the ratio of display period for the image by the white light.

A projection type display device according to the invention can include the display device according to the invention as described above. More specifically, the projection type display device according to the invention includes the above-described display device according to the invention and can continuously change the brightness of an image to be projected.

BRIEF DESCRIPTION OF THE DRAWINGS

The invention will be described with reference to the accompanying drawings, wherein like numerals reference like elements, and wherein:

FIGS. 4(a) and 4(b) are timing charts for use in illustration of how video signals are written and LEDs are turned on;

FIGS. 5 and 6 are histograms showing the distribution of gray levels of the video signals;

FIG. 7 shows how a display image is divided into a plurality of regions;

DETAILED DESCRIPTION OF EMBODIMENTS

Figure 1:
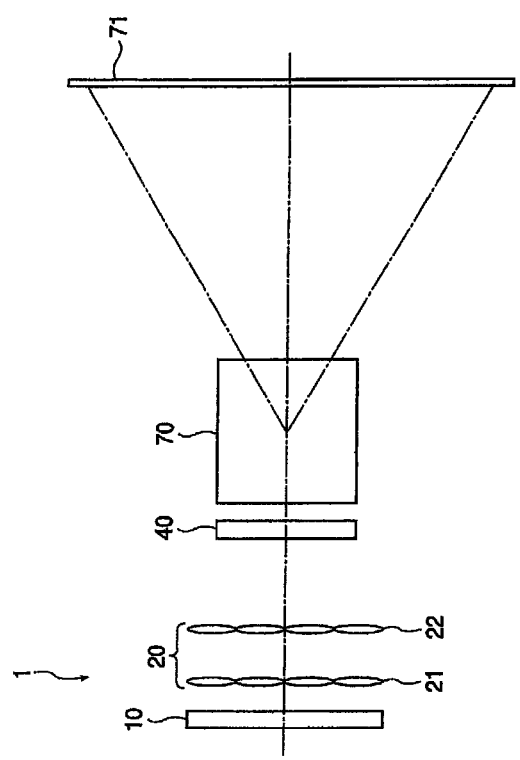
FIG. 1 is a schematic view of a projection type display device according to a first exemplary embodiment of the invention.

Now, a first exemplary embodiment of the invention will be described in conjunction with FIGS. 1 to 10. Referring to FIG. 1, a projection type display device (display device) according to the first exemplary embodiment will be described. The projection type display device according to the exemplary embodiment is a projection type color display device that modulates light emitted from a light source using a liquid crystal light valve and displays a color image based on the light.

FIG. 1 is a schematic view of the projection type display device according to the embodiment. As shown in FIG. 1, the projection type display device essentially includes an illuminating device 1 that time-sequentially emits color lights in colors R, G, B, and W (white), a liquid crystal light valve (light modulating means, a liquid crystal panel) 40 that modulates the lights in colors R, G, B, and W (hereinafter also as color lights R, G, B, and W) and a projection lens 70 that projects the modulated lights.

Figure 2:
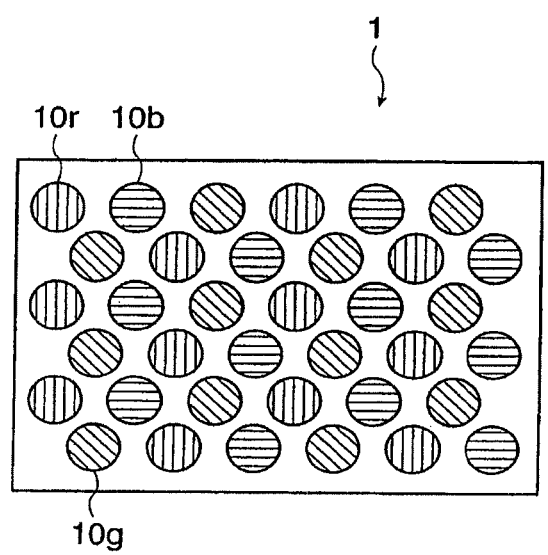
FIG. 2 is a schematic view of an illuminating device in the projection type display device according to the first exemplary embodiment.

FIG. 2 is a schematic view of the illuminating device in the projection type display device. The illuminating device 1 can include an LED array (light source) 10 that emits color lights R, G, B, and W as illuminating light, and an integrator lens system 20 that equalizes the illumination distributions of the emitted color lights R, G, B, and W.

As shown in FIG. 2, the LED array 10 can include an LED (a light emitting portion, a solid light source) 10r that emits a color light in R, an LED (a light emitting portion, a solid light source) 10g that emits a color light in G, and an LED (a light emitting portion, and a solid light source) 10b that emits a color light in B. These LEDs 10r, 10g, and 10b are repeatedly arranged in the vertical direction (the vertical direction in FIG. 2) in this order and columns of the LEDs 10r, 10g, and 10b are arranged in the lateral direction (the horizontal direction in FIG. 2). Between adjacent columns in the lateral direction, the LEDs are arranged shifted by half the interval of the LED arrangement in the vertical direction so that the LEDs 10r, 10g, and 10b can be arranged closely to each other. The LEDs that emit lights in the same colors are arranged not to be adjacent to each other.

The LED array 10 can supply current to the LEDs 10r, 10g, and 10b at the same time, so that a color light in W can be emitted from the LED array 10 by simultaneously emitting color lights R, G, and B from the LEDs 10r, 10g, and 10b, respectively.

As shown in FIG. 2, in the LED array 10, a plurality of sets of LEDs 10r, 10g, and 10b that emit color lights may be provided or one of each may be provided.

The integrator lens system 20 can include first and second integrator lenses 21 and 22 provided in this order from the side of the LED array 10. The integrator lenses 21 and 22 are formed as a micro lens array including a plurality of two-dimensionally arranged micro lenses. The first integrator lens 21 divides light (illumination light) emitted from the LED array 10 into a plurality of luminous fluxes, and the second integrator lens 22 serves as a convoluting lens that convolutes the fluxes in the position of the liquid crystal light valve 40. If necessary, a condenser lens for convoluting a two-dimensional light source image may be provided in the position of or succeeding the second integrator lens 22. In the following description, the second integrator lens is used as the convoluting lens.

The liquid crystal light valve 40 is made of an active matrix type, light-transmissive liquid crystal panel that has pixels for displaying images arranged in a matrix. The valve is driven to change the transmittance of incoming light (to carry out spatial modulation) based on a processed video signal on a pixel-basis. More specifically, voltage applied to the light-transmissive electrode of the liquid crystal light valve is controlled, so that the light transmittance is controlled in the range from almost 0% to 100%.

For the liquid crystal light valve 40, active matrix type, light-transmissive liquid crystal cells in TN (Twisted Nematic) mode using a thin film transistor (TFT) as a pixel switching element are used.

Now, a method of driving a projection type display device according to the exemplary embodiment will be described.

Figure 3:
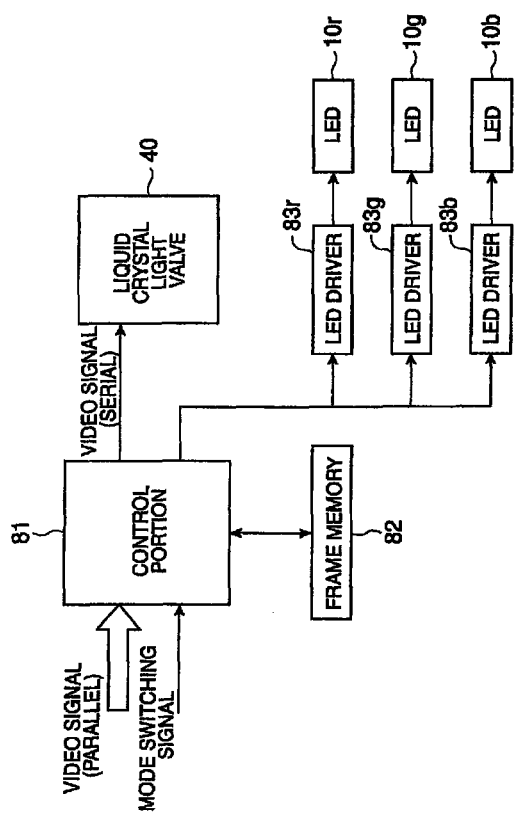
FIG. 3 is a block diagram of the configuration of a driving circuit in the projection type display device according to the first exemplary embodiment.
Figure 4:
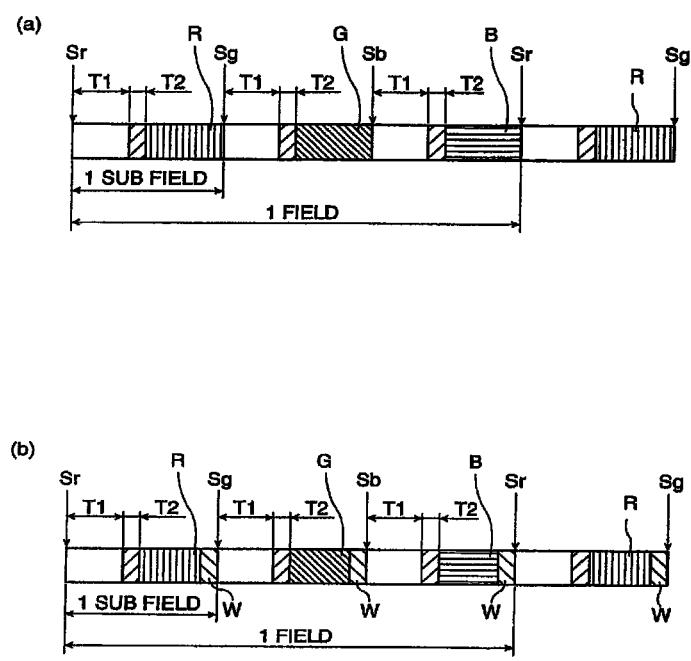

FIG. 3 is an exemplary block diagram of the configuration of a driving circuit for the projection type display device according to the embodiment. As shown in FIG. 3, according to the embodiment, video signals corresponding to color lights R, G, and B are input parallel to a control portion 81, and a timing signal is also input to the control portion 81.

The control portion 81 determines the timings of switching on the LEDs 10r, 10g, and 10b based on the input video signals. The video signals corresponding to the color lights R, G, and B input parallel to the control portion 81 are temporarily stored in a frame memory 82, and the video signals are sequentially obtained into the control portion 81 in the order in which they are to be displayed, for example in the order of the video signal corresponding to R, the video signal corresponding to G, and the video signal corresponding to B.

The video signals obtained into the control portion 81 are output to the liquid crystal light valve 40 in the order of input, together with the timing signal, and the liquid crystal light valve 40 controls the transmittance of light based on the input video signals and forms an optical modulation pattern. At the same time, the control portion 81 switches on the LEDs 10r, 10g, and 10b corresponding to the output video signals through any of the LED drivers 83r, 83g, and 83b and directs color lights corresponding to the video signals to the liquid crystal light valve 40. Consequently, the image corresponding to the color lights is projected on the screen 71 by the projection lens 70 (see FIG. 1).

Now, the relation between the writing of the video signals to the liquid crystal light valve 40 described above and the turning on of the LEDs in connection with time will be described with reference to FIGS. 4(a) and 4(b). FIGS. 4(a) and 4(b) are timing charts for use in illustration of how the video signals are written to the liquid crystal light valve 40 and the LEDs are switched on in connection with time.

The turning on timings of the LEDs can be divided into two kinds, one of which is color reproducibility-oriented timing (with no color light W emitted), and the other is brightness-oriented timing (with color light W emitted). FIG. 4(a) is for the color reproducibility-oriented method, and FIG. 4(b) is for the brightness-oriented method.

Note that these two kinds of turning on timings may be switched in response to a mode switch signal from a mode switch portion (not shown) provided in the projection type display device that allows the viewer to switch between the color reproducibility-oriented mode and the brightness-oriented mode. Alternatively, they may automatically be switched depending on the content and brightness of images to be displayed.

Referring to FIG. 4(a), the color reproducibility-oriented turning on timing will be described. As shown in FIG. 4(a), a color image is displayed on the basis of a field (one unit period) consisting of sub fields (sub unit periods) displaying images corresponding to R, G, and B. In the field, for example the sub fields corresponding to R, G and B are arranged in this order.

In the sub fields, video signals Sr, Sg, and Sb for R, G, and B are input to the liquid crystal light valve. Then, after a writing scanning period T1 during which the video signals are sequentially written to the liquid crystal light valve from the top end to the lower end and a response waiting period T2 necessary for the liquid crystal in the liquid crystal light valve to respond to the video signals, current corresponding to the video signals is supplied to the LEDs and color lights are irradiated to the liquid crystal light valve for a prescribed period.

After the irradiation of the color lights, the next video signals are input to the liquid crystal light valve, and the next sub field starts.

Now, referring to FIG. 4(b), the brightness-oriented turning on timing will be described. As shown in FIG. 4(b), the structures of the field and the sub fields for displaying a color image are the same as those by the color reproducibility-oriented turning on timing, and in each of the sub fields, the process from the input of the video signals to the passage of the response waiting period T2 is the same as that by the color reproducibility-oriented turning on timing.

After the response waiting period T2, color lights based on the video signals are irradiated for a prescribed period shorter than that by the color reproducibility-oriented turning on timing. Then, current is supplied to all the LEDs, and a color light W is irradiated to the liquid crystal light valve.

When the irradiation of the color light W ends, the next video signals are input to the liquid crystal light valve, and the next sub field starts.

As shown in FIGS. 4(a) and 4(b), the durations of the periods for the sub fields and the field are the same in the color reproducibility-oriented mode and the brightness-oriented mode.

Note that the ratio of the period of irradiating color lights R, G, and B in the sub fields and the period of irradiating the color light W is controlled based on an image to be displayed as will be described. The ratio can range from the case of irradiating only the color lights R, G, and B (in FIG. 4(a)) to the case of irradiating only the color light W (for black and white display).

Now, display video adaptive control, in other words, control according to which the ratio of period to irradiate the color light W is increased for a bright video scene while the ratio is reduced for a dark scene will be described.

In this case, as described above, the turning on timings for the LEDs 10r, 10g, and 10b are determined based on the video signals in the control portion 81, and there may be the following three kinds of methods.

(a) In image data included in images in a frame of interest, the gray level in the maximum brightness is used as a control signal.

Assume for example that there is a video signal including gray levels of 256 steps from 0 to 255. Assume that for one arbitrary frame forming continuous video, the appearance frequency distribution (histogram) of each of the gray levels of the pixel data included in the frame is as shown in FIG. 5. In FIG. 5, the brightest gray level included in the histogram is 150, and therefore the gray level of 150 is used as a control parameter to control the ratio of the period of irradiating the color light W. By this method, the brightness can be expressed most faithfully to the input video signals.

(b) Based on the appearance frequency distribution (histogram) per gray level included in a frame of interest, the gray level corresponding to a prescribed ratio (such as 10%) is used as a brightness control signal.

When for example the appearance frequency distribution of the video signals is as shown in FIG. 6, the region corresponding to 10% from the brighter side of the histogram is set as the region. If the gray level corresponding to the 10% point is 230, the gray level of 230 is used as a control parameter to control the ratio of the period of irradiating the color light W. As shown in the histogram in FIG. 6, when there is an abrupt peak near the gray level of 255 and the method (a) is employed, the gray level of 255 is used as a control parameter. Note however that the abrupt peak is not much significant as information in the displayed image as a whole. In contrast, by the method of using the gray level of 230 as the control parameter, determination is carried out based on a region that has a significance as information in the display image as a whole. The ratio may be changed about in the range from 2% to 50%.

(c) A display image is divided into a plurality of blocks, the average of the gray levels of the pixels included per block is obtained and the maximum value is used as a brightness control signal. As shown in FIG. 7, for example, the display image is divided into m×n blocks and the average values of the brightness (gray levels) for blocks $A_{11}, \ldots, A_{mn}$, are calculated, and the largest value among them is set as a control parameter. Note that the display image is preferably divided into about 6 to 200 blocks. By the method, the atmosphere of the display image as a whole is not altered and the brightness can be controlled.

Regarding the methods (a) to (c) described above, in addition to determining the control parameter for the entire display region, the methods may be applied for example to only a particular part of the display region, such as the central part. In this way, the brightness may be determined from the part of the image that would attract the viewer's attention. In this way, images corresponding to R, G, and B irradiated with color light W may be inserted in sub fields displaying the images corresponding to R, G, and B, so that the brightness of the color image to be displayed can be increased.

Based on the input video signal, the ratio of the period of irradiating the color light W can be adjusted, so that the brightness can be adjusted based on the content of the image to be displayed.

Since lights R, G and B can be emitted directly from the LEDs 10r, 10g, and 10b, respectively, the number of components and the size of the light source can be reduced for example as compared to the combination of the white light source and the color wheel.

The use of the LEDs 10r, 10g, and 10b can reduce heat generation, for example, as compared to a high pressure mercury lamp, and therefore input electric power can efficiently be converted into light. In this way, the power consumption by the light source can be reduced, so that the power consumption by the projection type display device can also be reduced.

The color light W can be emitted by simultaneously emitting the color lights R, G, and B, and therefore the kinds of necessary LEDs can be reduced as compared to the case in which an LED for emitting the color light W is separately provided. Therefore, when the size of the LED array 10 is equal, the number of LEDs 10r, 10g, and 10b that emit color lights R, G, and B can be increased by the number of LEDs for emitting the color light W, and the light quantity of the color lights to be emitted can be increased. On the other hand, when the numbers of the LEDs 10r, 10g, and 10b that emit the color lights R, G, and B is equal, the LED array 10 can be reduced in size by the size of the LEDs for the color light W that are not provided.

The color light W is emitted during a part of sub fields corresponding to color lights R, G, and B, and therefore the duration of one field or one sub field does not have to be changed and the brightness of the display image can continuously be changed simply by changing the turning on sequence of the LEDs. For example, unlike the case in which a sub field for the color light W is additionally provided, the duration of one field is not changed, and therefore the cycle of displaying images corresponding to color lights R, G, and B is not prolonged. Therefore, the images corresponding to the color lights R, G, and B hardly look disconnected, so that the picture quality of the images can be prevented from being lowered. Unlike the case in which a sub field for the color light W is additionally provided and the duration of a sub field is shortened (by raising the driving frequency) while the duration of one field is kept unchanged, the driving frequency for the projection type display device does not change, and therefore the brightness of the display image can be changed readily and continuously without changing the driving circuit in the projection type display device.

Figure 8:
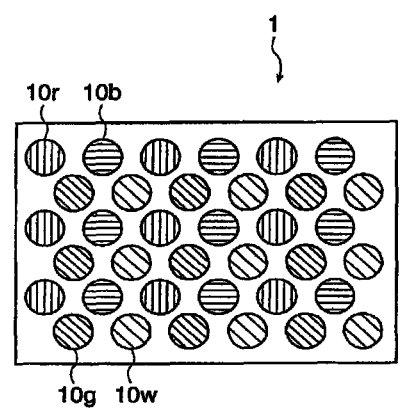
FIG. 8 is a schematic view of another example of the illuminating device in the projection type display device according to the exemplary embodiment.
Figure 9:
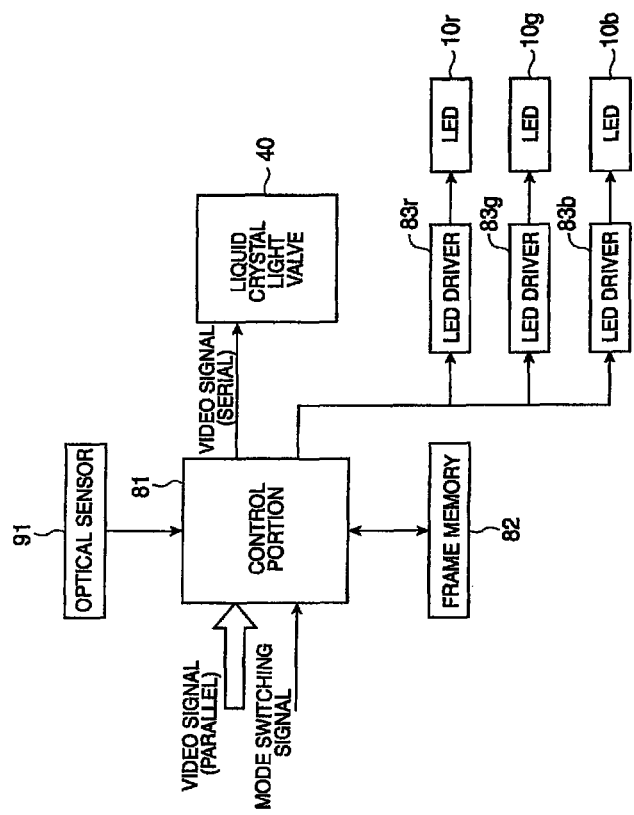
FIGS. 9 and 10 are block diagrams each showing another example of the configuration of the driving circuit in the projection type display device according to the exemplary embodiment.

The LED array 10 may include LEDs 10r, 10g, and 10b that emit color lights R, G, and B as shown in FIG. 2, while as shown in FIG. 8, an LED 10w (a white light emitting portion, a solid light source) that emits the color light W may additionally be provided. In other words, the array may include the LEDs 10r, 10g, 10b, and 10w.

In this way, the color light W can be emitted from the LED 10w, and therefore as compared to the case in which the color light W is emitted by simultaneously emitting the color lights R, G, and B, the number of LEDs to turn on in emitting the color light W is reduced, which can keep fluctuations in the power consumption in a small level.

If necessary, the color light W may be emitted together with the color lights R, G, and B, so that a much brighter image than the case of emitting only the color lights R, G, and B can be obtained.

The ratio of the period of irradiating the color lights R, G, and B in sub fields and the period of irradiating the color light W may be controlled depending on video to be displayed as described above, while as shown in FIG. 9, an optical sensor (a brightness detection device) 91, such as a CCD (Charge Coupled Device) that detects the ambient brightness, may be provided, so that the ratio of the period of emitting the color light W may be controlled based on the output of the optical sensor 91. In this way, the brightness of a displayed image can be adjusted based on the ambient brightness, so that the displayed image can easily be viewed.

Figure 10:
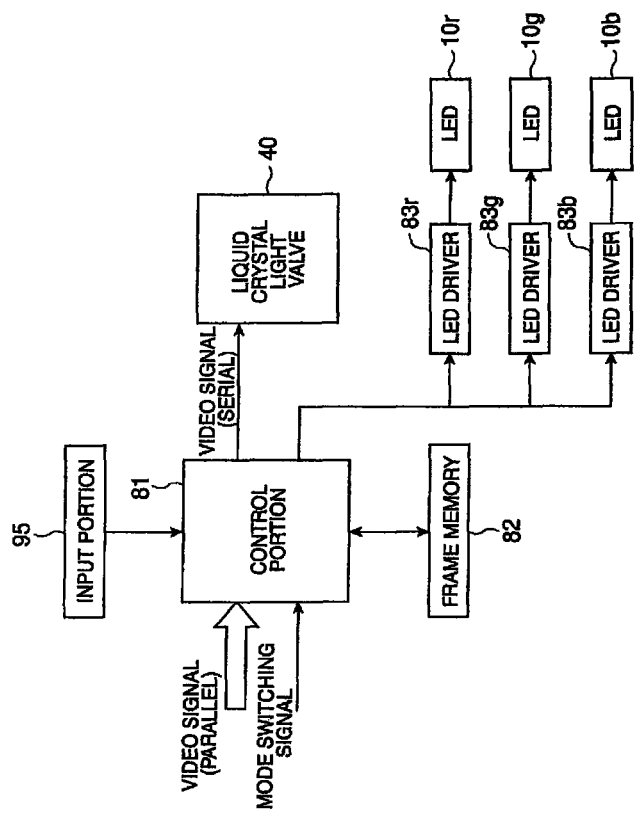

As shown in FIG. 10, there may be an input portion 95 that determines the brightness of an image to be displayed (the ratio of the period of emitting the color light W), so that the viewer may input a desired brightness level to the input portion 95 and the ratio of period of irradiating the color light W may be controlled in response to a signal output from the input portion 95. In this way, the brightness of the displayed image can be adjusted by the input portion 95 based on the signal output from the input portion 95, so that the brightness of the displayed image can be adjusted to the viewer's taste.

Now, a second exemplary embodiment of the invention will be described in conjunction with FIGS. 11 to 15. The structure of the projection type display device according to the exemplary embodiment is the same as that of the first exemplary embodiment, but the driving method is different from that according to the first exemplary embodiment. Therefore, in the following description of the second exemplary embodiment, only the method of driving the projection type display device will be described in conjunction with FIGS. 11 to 15, and the structure of the display device will not be described.

Figure 11:
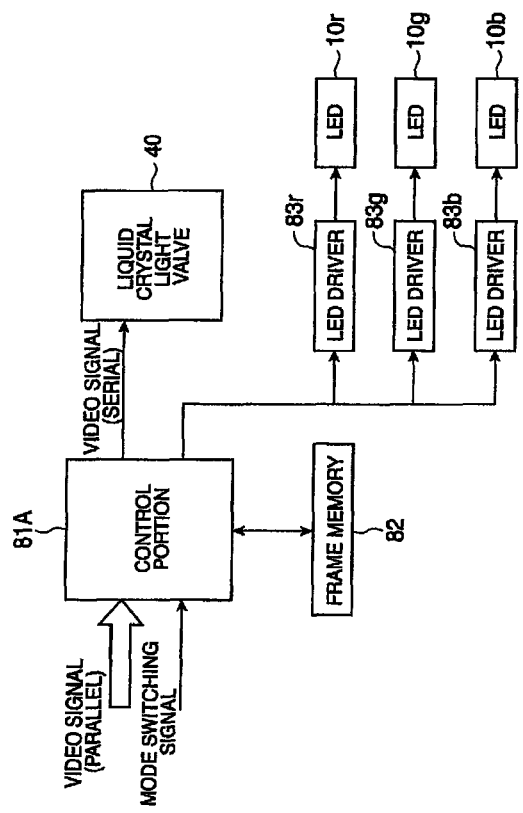
FIG. 11 is a block diagram of the configuration of a driving circuit in a projection type display device according to a second exemplary embodiment of the invention.
Figure 12:
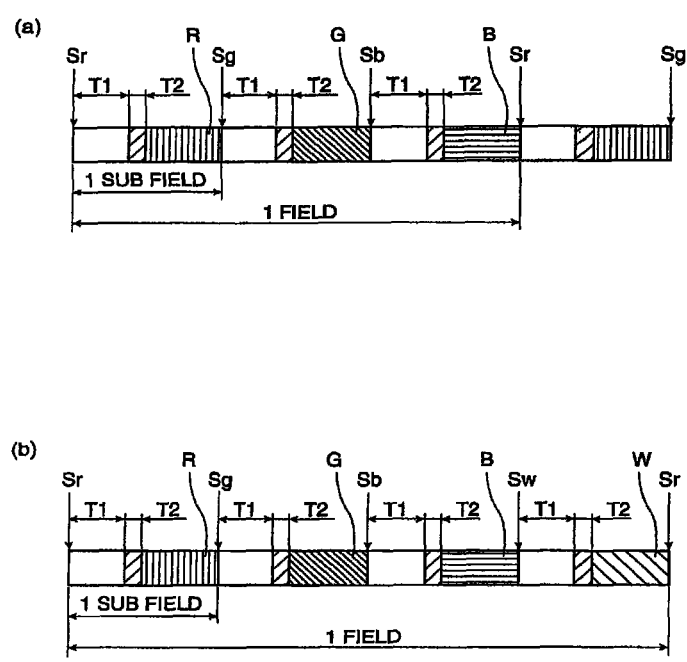
FIGS. 12(a) and 12(b) are timing charts for use in illustration of how video signals are written and LEDs are turned on according to the exemplary embodiment.
Figure 13:
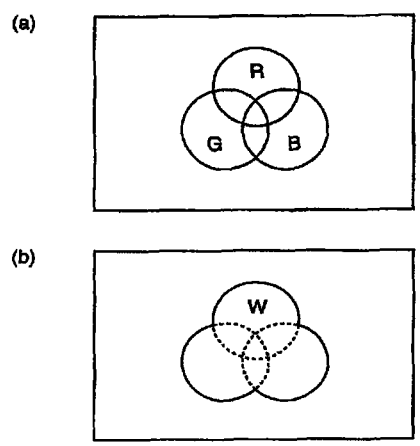
FIGS. 13(a) and 13(b) are views for use in illustration of how a video signal corresponding to a color light W is produced.
Figure 14:
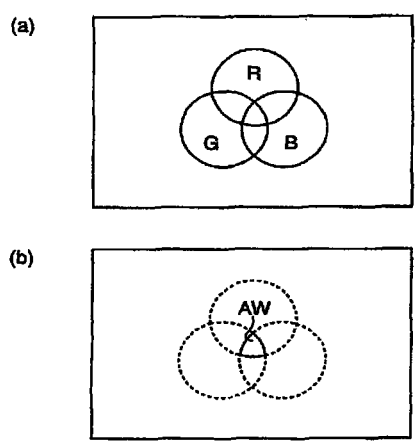
FIGS. 14(a) and 14(b) are views for use in illustration of how a video signal corresponding to a color light W is produced.

FIG. 11 is an exemplary block diagram of the configuration of the driving circuit for the projection type display device according to the embodiment. Now, the method of driving the projection type display device according to the embodiment will be described. As shown in FIG. 11, according to the exemplary embodiment, video signals corresponding to color lights R, G, and B are input parallel to a control portion 81A, and a timing signal is also input to the control portion 81A.

The control portion 81A produces a video signal corresponding to a color light W based on the input video signals (the method of which will be described below), and the timings of turning on the LEDs 10r, 10g, and 10b are determined. Then, the video signals corresponding to the color lights R, G, and B input parallel to the control portion 81A and the video signal corresponding to the color light W are temporarily stored in a frame memory 82, and then obtained into the control portion 81A in the order of the video signal to be displayed, for example in the order of the video signal corresponding to R, the video signal corresponding to G, and the video signal corresponding to B.

The video signals obtained into the control portion 81A are output to the liquid crystal light valve 40 together with the timing signal in the order in which they are obtained, and the liquid crystal light valve 40 controls the transmittance of light based on the input video signals and forms an optical modulation pattern. At the same time, the control portion 81A turns on the LEDs 10r, 10g, and 10b corresponding to the output video signals through any or all of the LED drivers 83r, 83g, and 83b and color lights corresponding to the video signals are irradiated to the liquid crystal light valve 40. Consequently, the image corresponding to the color lights R, G, B, and W is projected on the screen 71 by the projection lens 70 (see FIG. 1).

Now, the relation between the writing of the video signals to the liquid crystal light valve 40 described above and the turning on of the LEDs in connection with time will be described with reference to FIGS. 12(a) and 12(b). FIG. 12(a) is a chart for use in illustration of the relation between a field and sub fields in the color reproducibility-oriented mode, and FIG. 12(b) is a chart for use in illustration of the relation between a field and sub fields in the brightness-oriented mode.

In the color reproducibility-oriented mode, the relation between the field and the sub fields is the same as that according to the first exemplary embodiment and is as shown in FIG. 12(a) and no further description will be provided about it.

Now, referring to FIG. 12(b), the relation between a field and sub fields in the brightness-oriented mode will be described. As shown in FIG. 12(b), a color image is displayed on the basis of one field consisting of sub fields (sub unit periods) that display images corresponding to R, G, and B, and a sub field that displays an image corresponding to W. One field is made of for example sub fields corresponding to R, G, B, and W arranged in this order.

The sub fields corresponding to R, G, and B are the same as those according to the first exemplary embodiment, and are as shown in FIG. 12(b) and no further description will be provided about it.

The sub field corresponding to W starts from the point when the irradiation of the color light B ends and the video signal Sw for W is input to the liquid crystal light valve. Then, after the writing scanning period T1 and the response waiting period T2, current is supplied to all the LEDs, and the color light W is irradiated to the liquid crystal light valve for a prescribed period. When the irradiation of the color light W ends, the next video signal Sr is input to the liquid crystal light valve and the next sub field is started.

As shown in FIGS. 12(a) and 12(b), the duration of each sub field is the same in the color reproducibility-oriented mode and the brightness-oriented mode, and the sub field for displaying the image corresponding to W is additionally provided, which extends the period of one field. In this way, in addition to the sub fields for displaying images corresponding to R, G, and B, a sub field for displaying an image corresponding to W is additionally provided in one field, so that the brightness of the color image to be displayed can be increased.

Now, a method of producing a video signal corresponding to the color light W according to the exemplary embodiment will be described. As described above, the video signal corresponding to the color light W is produced based on the video signal in the control portion 81A as described above, and the following two methods may be employed.

(1) The video signals corresponding to R, G, and B are multiplied by prescribed coefficients, and the sum of the results may be used as a video signal corresponding to W.

As shown in FIG. 13(a), for example, when video signals Sr, Sg, and Sb corresponding to images in R, G, and B are multiplied by coefficients $\alpha$, $\beta$, and $\gamma$, respectively, and the sum of the results is a video signal Sw corresponding to an image in W ($Sw = \alpha Sr + \beta Sg + \gamma Sb$), the video signal Sw corresponding to W provides an image as shown in FIG. 13(b). By this method, in a sense, the black and white version of the color image expressed by the R, G, and B images is attained as an image for W, and the displayed image as a whole can be brightened depending on the brightness distribution of the image.

Figure 15:
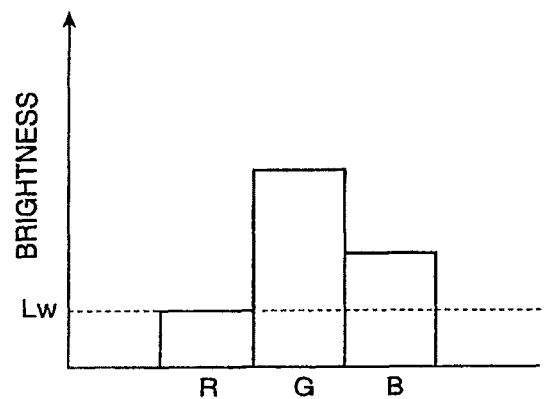
FIG. 15 is a view for use in illustration of how a video signal corresponding to a color light W is produced.

(2) A video signal representing a region in which images corresponding to R, G, and B overlap in the lowest brightness level among the R, G, and B images is attained as a video signal corresponding to W. When for example images corresponding to R, G, and B are arranged as shown in FIG. 14(a), and the video signals based on which the images are displayed in the brightness levels shown in FIG. 15 are input, a video signal displaying the region Aw in which images corresponding to R, G, and B shown in FIG. 14(b) overlap in the lowest brightness level Lw among the images R, G, and B shown in FIG. 15 is produced. By this method, the region to be originally displayed in white can further be brightened, and the bright region in the image can further be enhanced in brightness.

In this way, a sub field that emits a color light W is additionally provided, so that the image corresponding to the color light W can separately be displayed. More specifically, the brightness can effectively be changed based on the content of the image, for example for enhancing the brightness in a prescribed region of the image, because the image corresponding to the color light W does not depend on the images corresponding to the other color lights.

Since the duration of the sub field does not change, the brightness of the image to be displayed can continuously be changed without changing the driving frequency for the projection type display device. For example, as compared to the case of shortening the duration of each sub field and keeping the duration of one field unchanged, the brightness of the display image can readily be changed continuously because the driving frequency for the projection type display device is not changed and the driving circuit for the projection type display device does not have to be changed either.

Figure 16:
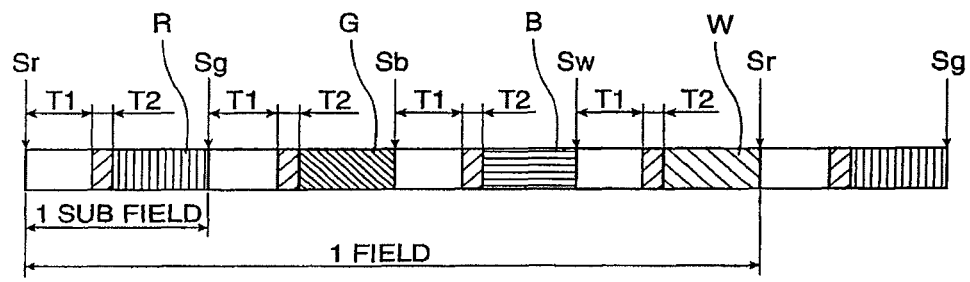
FIG. 16 is a timing chart for use in illustration of how video signals are written and LEDs are turned on according to the exemplary embodiment.

As described above, the duration of the sub field in the color reproducibility-oriented mode and the brightness-oriented mode may be the same or as shown in FIG. 16, the duration of the sub field in the brightness-oriented mode may be shortened and the duration of the field in the color reproducibility-oriented mode and the brightness-oriented mode may be the same. In this way, since the duration of one field does not change, the cycle of displaying images corresponding to color lights does not change regardless of whether the color reproducibility-oriented mode or the brightness-oriented mode is employed. Consequently, the images corresponding to the color lights hardly look disconnected, so that the picture quality of the images can be prevented from being lowered.

It should be noted that the technical coverage of the invention is not limited to the above-described exemplary embodiments, and various modifications can be made without departing from the spirit and scope of the invention. For example in the above embodiments, the invention is applied to the projection type display device, but the invention may be applied to displays of other kinds, such as a direct-view type display device without limiting application to the projection type display.

According to the embodiments, the light transmissive liquid crystal light valve is employed as the optical modulation means, while light valves of other kinds, such as a reflection type liquid crystal light valve can be employed without limiting application to the light transmissive liquid crystal light valve.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A display device, comprising:
a first light source configured to emit a first color light;
a second light source configured to emit a second color light;
a third light source configured to emit a third color light;
a memory configured to store a video signal
an optical modulation device configured to modulate the first color light, the second color light, and the third color light based on the video signal;
a controller configured to control the first light source, the second light source, and the third light source, the controller controlling the light sources such that the first, second and third color lights are each sequentially emitted in a respective sub unit period, the sub unit periods being produced by dividing one unit period for producing an image based on the video signal; and
a mode switch portion configured to switch between a first mode and a second mode, a single sub unit period for the first color light having a single duration in both the first and second modes, wherein
in the first mode, the controller controls the first light source the second light source, and the third light source to turn on simultaneously at least one time to emit white light, the first color light being emitted in the first mode for a first time portion of the single sub unit period having the single duration, and the white light being emitted in the first mode for a second time portion of the single sub unit having the single duration such that the first time portion and the second time portion together define the single duration of the single sub unit period, wherein the controller varies a ratio of a period of emitting the white light relative to a total of periods of emitting the lights from the light sources for emitting the white light, and
in the second mode, the controller controls the first light source, the second light source, and the third light source to turn on separately at distinct times, the first color light being emitted in the second mode for a third time portion of the single sub unit period having the single duration such that the third time portion defines the single duration of the single sub unit period, the third time portion being longer than the first time portion.

2. The display device according to claim 1, wherein the ration of the period of emitting the white light relative to the total of periods of emitting the lights is capable of being adjusted to a prescribed value.

3. The display device according to claim 2, wherein the ratio of the period of emitting the white light is adjusted based on a video signal input to the display device.

4. The display device according to claim 2, further comprising:
a brightness detection device that detects an ambient brightness,
the ratio of the period of emitting the white light being adjusted based on an output of the brightness detection device.

5. The display device according to claim 2, further comprising:
an input portion that inputs the ratio of the period of emitting said white light,
the ratio of the period of emitting the white light being adjusted based on information input to the input portion.

6. The display device according to claim 1, wherein
each of the first, second and third light sources has a light emitting portion that emits the respective color light.

7. The display device according to claim 6, wherein
the light emitting portion is a solid light source.

8. The display device according to claim 6, wherein
during the period of emitting the white light, the white light is emitted by simultaneously emitting the first, second and third color lights from the respective light emitting portions.

9. The display device according to claim 1, wherein
the optical modulation device is a liquid crystal panel.

10. A projection type display device, comprising:
a display device according to claim 1.

11. A displaying method, comprising:
providing a first light source configured to emit a first color light;

providing a second light source configured to emit a second color light;

providing a third light source configured to emit a third color light;

providing a memory configured to store a video signal providing an optical modulation device configured to modulate the first color light, the second color light, and the third color light based on the video signal;

controlling the first light source, the second light source, and the third light source such that the first, second and third color lights are each sequentially emitted in a respective sub unit period, the sub unit periods being produced by dividing one unit period for producing an image based on the video signal; and switching between a first mode and a second mode, a single sub unit period for the first color light having a single duration in both the first and second modes, wherein in the first mode, the first light source the second light source, and the third light source to turn on simultaneously at least one time to emit white light, the first color light being emitted in the first mode for a first time portion of the single sub unit period having the single duration, and the white light being emitted in the first mode for a second time portion of the single sub unit having the single duration such that the first time portion and the second time portion together define the single duration of the single sub unit period, controlling a ratio of a period of emitting the white light relative to a total of periods of emitting the lights from the light sources for emitting the white light, and in the second mode, the first light source, the second light source, and the third light source are controlled to turn on separately at distinct times, the first color light being emitted in the second mode for a third time portion of the single sub unit period having the single duration such that the third time portion defines the single duration of the single sub unit period, the third time portion being longer than the first time portion; and modulating the lights emitted from the light sources by the optical modulation device.

* * * * *